(12) United States Patent
Youngblood et al.

(10) Patent No.: US 10,669,404 B2
(45) Date of Patent: Jun. 2, 2020

(54) FUNCTIONALIZED CELLULOSE NANOCRYSTAL MATERIALS AND METHODS OF PREPARATION

(71) Applicant: Purdue Research Foundation, West Lafayette, IN (US)

(72) Inventors: Jeffrey Paul Youngblood, Crawfordsville, IN (US); Youngman Yoo, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/081,446

(22) PCT Filed: Feb. 27, 2017

(86) PCT No.: PCT/US2017/019578
§ 371 (c)(1),
(2) Date: Aug. 31, 2018

(87) PCT Pub. No.: WO2017/151455
PCT Pub. Date: Sep. 8, 2017

(65) Prior Publication Data
US 2019/0092926 A1 Mar. 28, 2019

Related U.S. Application Data

(60) Provisional application No. 62/302,652, filed on Mar. 2, 2016.

(51) Int. Cl.
| C08L 1/10 | (2006.01) |
| C08B 1/02 | (2006.01) |
| C08B 3/02 | (2006.01) |
| C08B 3/00 | (2006.01) |

(52) U.S. Cl.
CPC .............. *C08L 1/10* (2013.01); *C08B 1/02* (2013.01); *C08B 3/00* (2013.01); *C08B 3/02* (2013.01); *C08L 2205/16* (2013.01); *Y02P 20/582* (2015.11)

(58) Field of Classification Search
CPC ..................................... C08L 1/10; C08L 1/14
See application file for complete search history.

(56) References Cited

U.S. PATENT DOCUMENTS

| 4,443,595 A * | 4/1984 | Namikoshi | ............... C08B 3/14 536/56 |
| 4,451,664 A | 5/1984 | Ranade | |
| 5,480,922 A * | 1/1996 | Mulhaupt | ................. C08B 3/16 524/41 |
| 2007/0178152 A1 | 8/2007 | Shelton | |
| 2010/0168365 A1 | 7/2010 | Umemoto | |
| 2012/0202984 A1* | 8/2012 | Buchanan | ............... C08B 1/003 536/65 |
| 2015/0004237 A1* | 1/2015 | Edgar | ..................... A61K 47/38 424/489 |
| 2015/0141639 A1* | 5/2015 | Toyama | ..................... C08B 3/00 536/70 |
| 2016/0002483 A1 | 1/2016 | Zhao et al. | |

FOREIGN PATENT DOCUMENTS

CN 101410416 A * 4/2009 ............... C08B 3/16

OTHER PUBLICATIONS

Gardebjer et al. (Composites Science and Technology 107 (2015), 1-9) (Year: 2015).*
Machine Translation of CN 101410416, 2019 (Year: 2019).*
International Search Report and Written Opinion of the International Searching Authority received for PCT Patent Application PCT/US2017/019578, dated May 10, 2017, 6 pages.
Braun B., et al., Supra-Molecular EcoBioNanocomposites Based on Polylactide and Cellulosic Nanowhiskers: Synthesis and Properties. Biomacromolecules 2012, 13, 2013-2019.

* cited by examiner

*Primary Examiner* — Liam J Heincer
(74) *Attorney, Agent, or Firm* — Purdue Research Foundation; Zhigang Rao

(57) ABSTRACT

The surface hydrophobization of cellulose nanocrystals (CNCs) by carboxylic acids, biodiesel, or plant oils was conducted via there herein disclosed green process using an one-pot synthetic method. In the process, an aqueous lactic acid syrup served as a solvent to provide a stable and well-dispersed water suspension of CNCs and participated in esterification reactions to produce an intermediate product of polylactic acid (PLA) oligomer grafted CNCs (CNC-g-PLA). This solvent and intermediate product system allows for an in situ solvent exchange from water to lactic acid without prior drying of the CNCs and a subsequent efficient esterification reaction of CNCs with carboxylic acids or esters having a long hydrocarbon chain (FAs). Another advantage of the disclosed process is the ability to reuse the reagents in the subsequent reaction in order to reduce the production cost. Grafting of renewable materials on the surface of CNCs was developed by polyesterification that is capable of being environmentally friendly and mass-produced without any organic solvents or toxic reagents.

3 Claims, No Drawings

FUNCTIONALIZED CELLULOSE NANOCRYSTAL MATERIALS AND METHODS OF PREPARATION

CROSS REFERENCE TO RELATED APPLICATIONS

This patent application claims benefit of U.S. Provisional Patent Application Ser. No. 62/302,652 filed Mar. 2, 2016, which is incorporated herein by specific reference.

GOVERNMENT RIGHT

This invention was made with government support under 11-JV-11111129-118 awarded by the United States Department of Agriculture. The government has certain rights in the invention.

TECHNICAL FIELD

The present disclosure generally relates to carboxylic acid grafted cellulose nanoparticle compositions, and to one-pot synthesis for surface hydrophobization of cellulose nanocrystals by carboxylic acids, biodiesel, and/or plant oils.

BACKGROUND

This section introduces aspects that may help facilitate a better understanding of the disclosure. Accordingly, these statements are to be read in this light and are not to be understood as admissions about what is or is not prior art.

Cellulose is the most abundant bio-based material on earth (more than 50% of the biomass). Cellulose occurs naturally in, for example, trees, cotton, bacteria, and algae. The cellulose fibers in wood are composed of amorphous and crystalline regions. These crystalline regions are rod-shaped, nano-sized particles remaining after the acid hydrolysis of amorphous regions of cellulose fibers. During the past decade, there has been a great interest in these Cellulose Nanocrystals (CNCs) due to their unique characteristics. CNCs have a high aspect ratio. CNCs are 100% renewable, very strong, stiff, resilient, and light weight. Therefore, the intriguing ability of CNCs to reinforce host materials and form a dense network leads to highly versatile, sustainable, and environmentally friendly polymer composites capable of enhancing mechanical and physical properties.

However, there are limitations and drawbacks, which are linked to their intrinsic physical properties including high moisture absorption of CNCs based materials, agglomeration of nanoparticles, difficulty in redispersing agglomerated particles, and incompatibility with hydrophobic polymers in nanocomposite applications. The incompatibility with hydrophobic polymers in nanocomposite applications limits the use of CNCs as reinforcing agents for thermoplastic composite applications due to the low compatibility of CNCs in organic media (both solvents and polymer matrices). Moreover, even if CNCs are relatively compatible, it is not easy to redisperse the agglomerated CNCs caused by the strong hydrogen bonding of the crystals into a solution or polymer matrix. The most optimal solution to this issue is surface hydrophobization of CNCs. The surface hydrophobization is achieved by the use of direct chemical modification of the enormous number of hydroxyl groups in the structure of CNCs. When carbodiimide, isocyanates, epoxides, acid anhydrides, acid halides, and alkyl halides are used as a covalent attachment of molecules, they react with the surface hydroxyl groups of cellulose to yield hydrophobic surfaces bearing hydrocarbon moieties that promote an excellent dispersion of CNCs in organic media. Moisture sensitivity and corresponding dimensional changes can be considerably avoided if the CNCs are fairly modified by hydrophobic attachments and there are strong interactions between the modified CNCs and polymer matrix. Functionalization of CNCs has already been much reported in the literature using (1) physical adsorption of some types of surfactants, (2) covalent attachment of molecules, and (3) grafting polymers at the surface of the CNCs.

Nonetheless, most of these techniques require the use of hazardous solvents and reactants which are toxic to human health and the environment, are complex and multistep synthetic pathways, and yield low modification. It is difficult for CNCs to react with organic reagents directly due to their poor solubility in the organic phase. CNCs in a water suspension need a solvent exchange with dimethyl sulfoxide (DMSO), dimethyl formamide (DMF), or other compatible solvent. The reactions also need special reagents such as acid chloride, acid anhydride, isocyanate or carbodiimide which can be difficult to handle and are expensive. Furthermore, process lines exposed to organic solvents that release high levels of volatile organic compounds (VOCs) as chemical gasses can pollute the air and have a harmful effect on human health. Nowadays, people are increasingly demanding products that emit lower levels of VOCs. Therefore, there has been a great effort from both academia and industry in the development of green technologies capable of changing the use of toxic organic solvents to safer alternatives such as solvent-free reactions or aqueous media reactions. Many research projects related to this issue aim to reduce solvent-derived environmental harm. Therefore, there is an unmet need for the development of safer, more economically feasible, and more ecofriendly methods, accompanied with higher grafting yields.

In addition, the direct grafting of large molecules such as long chain fatty acids at the surface of the CNCs may not provide sufficient grafting of the hydroxyl groups. There is a need for improved strategy to make new hydrophobilized CNCs having compatibility with hydrophobic polymers in nanocomposite applications.

SUMMARY

In one embodiment, the present disclosure provides a composition of cellulose nanoparticles, wherein the chemical structure of the cellulose nanoparticles comprising a glucose unit of formula I:

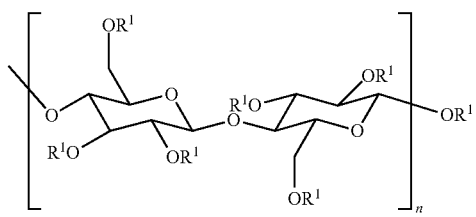

Wherein $R^1$ is H or

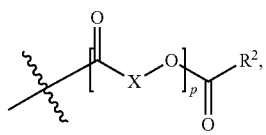

wherein each $R^1$ in formula I may be the same or different, and at least one $R^1$ is not H;

X is C1-C8 straight or branched carbon linker, wherein X is optionally substituted with C1-C4 alkyl, F, Cl, —OMe, or OEt;

$R^2$ is a C5-C10 hetero or carbon aryl wherein the hetero aryl comprising N, O or S; a C1-C24 straight or branched alkyl or alkenyl, wherein the C1-C24 straight or branched alkyl or alkenyl is optionally substituted with a C5-C10 hetero or carbon aryl wherein the hetero aryl comprising N, O or S, a C1-C4 alkyl, F, Cl, —OMe, or OEt; and n is 10-20,000, p is 1-12.

In another embodiment, the present disclosure provides a method of making a composition of cellulose nanoparticles with a chemical structure comprising a glucose unit of formula I, wherein the method comprises:

a) contacting cellulose nanoparticles with water, an catalyst suitable for esterification, and a carboxylic acid with the formula of HOOC—X—OH, wherein X is C1-C8 straight or branched carbon linker, wherein X is optionally substituted with C1-C4 alkyl, F, Cl, —OMe, or OEt, and heating the formed mixture;

b) removing water to facilitate the esterification reaction; and c) adding a carboxylic acid with the formula of $HOOCR^2$, wherein $R^2$ is a C5-C10 hetero or carbon aryl wherein the hetero aryl comprising N, O or S; a C1-C24 straight or branched alkyl or alkenyl, wherein the C1-C24 straight or branched alkyl or alkenyl is optionally substituted with a C5-C10 hetero or carbon aryl wherein the hetero aryl comprising N, O or S, a C1-C4 alkyl, F, Cl, —OMe, or OEt.

DETAILED DESCRIPTION

For the purposes of promoting an understanding of the principles of the present disclosure, reference will now be made to the embodiments illustrated in specific language will be used to describe the same. It will nevertheless be understood that no limitation of the scope of this disclosure is thereby intended.

In response to the unmet need, presented herein is one-pot synthesis for surface hydrophobization of cellulose nanocrystals by carboxylic acids, biodiesel, and/or plant oils to make new hydrophobilized CNCs compatibility with hydrophobic polymers in nanocomposite applications. Herein we focus on the surface hydrophobization of cellulose nanocrystals in aqueous conditions. As demonstrative of the principles and processes set forth herein, surface modification treatments for CNCs were conducted by grafting fatty acids (FAs), biodiesel, or plant oils in order to improve the dispersion of nanoparticles in organic solvents. The key factor of this one-pot synthesis process is the use of lower molecule hydroxylated carboxylic acid such as lactic acid, which is also a reactant of the hydrophobization synthesis, as a solvent for the esterification of CNCs with acids or esters having a long hydrocarbon chain. Furthermore, the small molecule hydroxylated carboxylic acid derivatives such as lactic acid derivatives can be reused in order not only to decrease the environmental footprint of the product, but also to enhance economic feasibility. It is shown herein that approximately one-third of all the available hydroxyl groups on the surface of cellulose nanoparticles were modified with polylactic acid oligomer and fatty acid side chains. This level is enough to improve dispersibility in various organic solvents without damaging structural morphology and crystallinity of the grafted CNCs. Surface hydrophobization methods of CNCs through one-pot-one-step and/or one-pot-two-step esterification reaction were compared according to fatty acids and their esters as a reagent. Fatty acid reagents had better grafting efficiency than other reagents for two-step reaction. The reverse was true of fatty acid ester reagents due to their low wettability in lactic acid derivatives medium. For the determination of a grafted moiety, utilizing a long chain aliphatic carboxylic acid (a high-boiling substance) was more viable approach due to higher grafting efficiency and more dispersibility of grafted CNCs in various organic solvents such as acetonitrile, acetone, tetrahydrofuran, 1-methoxy-2-propanol, and chloroform. Therefore, the simple, ecofriendly and industrially-friendly technology of this one-pot reaction process meets the feasibility standards for scaling up a surface modification process of CNCs.

One strategy of the present disclosure is to avoid toxic solvents and reagents (non-biodegradable) by using one of the reacting agent, such as DL-lactic acid syrup that may be oligomerized by water distillation, as a solvent for the reaction. This disclosure also suggests that the reactants, which are presented herein, can be recycled after reaction in order to reduce the environmental footprint of the product as well as enhance economic feasibility.

One additional strategy of the present disclosure is to use a two-step grafting method. Polylactic acid (PLA) oligomers and unreacted lactic acid may act as a solvent for the hydrophobization of CNCs to provide an intermediate product of a short chain PLA grafted CNC in the first step. Then, the PLA oligomer grafted CNC (CNC-g-PLA) can be more hydrophobically modified via an esterification of fatty acids (or plant oils containing several different kinds of fatty acids) in the PLA oligomers medium having increased wettability in the organic phase. It is critical to form an intermediate product of the short chain PLA grafted CNC in the first step because the direct grafting with a long chain fatty acid may not react with enough hydroxyl groups on cellulose nanoparticles to achieve sufficient hydrophobilization.

The reason the reaction in the present disclosure can be conducted in "One-Pot" is that the in situ solvent exchange through the esterification reaction of the lactic acid driven by water evaporation without prior drying of the CNC. This route is likely to increase grafting efficiency. It is also possible to retain a high content of CNC in the final product since a polyesterification reaction of the lactic acid reaches equilibrium when having a short chain length of PLA (repeating unit 2 to 10) unlike the typical ring opening polymerization (ROP) of a DL-lactide monomer. The use of sustainable, bio-derived lactic acid and fatty acids for the esterification of CNCs not only allows higher grafting efficiency of CNC, but also leads to an environmentally friendly production process, sustainability, low VOC emission level, ease of use, and high safety. Wood derived CNCs were modified with different lengths of fatty acids using this single pot, aqueous surface hydrophobization reaction.

The grafting density and efficiency of the CNCs prepared in the present disclosure was examined with infrared spectroscopy (FT-IR), solid-state $^{13}$C NMR (ss-$^{13}$C NMR), and elemental analysis (EA). The crystallinity of a core of unmodified cellulose was measured with X-ray diffraction (XRD) and Solid State-NMR (ss-NMR). Different organic solvents were used here to define relative hydrophobicity of the modified CNCs comparing transmittance of their suspensions in the ultraviolet and visible (UV-Vis) spectrometer, and evaluating their hydrodynamic radius by dynamic light scattering (DLS) techniques.

Scheme 1: Synthesis of hydrophobilized nanoparticles

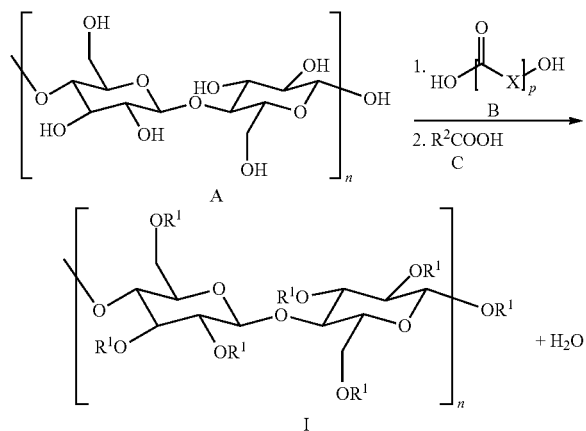

Scheme 1 provides the general scheme for the synthetic method to prepare cellulose nanoparticles, wherein the chemical structure of the cellulose nanoparticles comprising a glucose unit of formula I. Untreated cellulose nanoparticles A is treated with a hydroxyl carboxylic acid B, water and an appropriate catalyst at elevated temperature. The hydroxyl carboxylic acid B serves as both a reactant and a co-solvent with water. During the esterification, the formed water and the originally added water is removed from the system by method such as distillation to provide an intermediate product such as CNC-g-PLA (poly lactic acid grafted CNC). The intermediate product can further react with a longer chain carboxylic acid C to provide the cellulose nanoparticles, wherein the chemical structure of the achieved cellulose nanoparticles comprising a glucose unit of formula I. This method is referred as One-Pot-Two-Step reaction.

In one embodiment, materials A, B, C and water can be added together before heating the resulted mixture. This is method is referred as One-Pot-One-Step reaction.

Method 1 to Prepare Fatty Acid Grafted CNCs (One-Pot-Two-Step)

Aqueous CNC suspension at 11.9% (w/w) was diluted into deionized (DI) water to give a final suspension concentration of 5 wt %. An excess of 85% (w/w) DL-lactic acid syrup (the equivalent COOH of the lactic acid: OH of the dried CNC ratio=10) was added to the aqueous CNC suspension and ultra-sonicated for 1 min. The mixture was added to a 500 ml 3-neck flask provided with a stirrer and a condenser. Then, 150 ppm of a zinc acetate dihydrate catalyst according to the DL-lactic acid (LA) syrup weight was further added thereto, and polyesterification reaction was performed by heating at 180° C.

After 70 to 99% of the water by-product was removed, an excess amount of fatty acid reactant (the equivalent COOH of the fatty acid: OH of the dried CNC ratio=2.8) and 200 ppm of a dibutyltin dilaurate (DBTDL) catalyst according to the fatty acid weight were introduced to the intermediate products, which are composed of PLA oligomer grafted CNC (CNC-g-PLA) and PLA homo-polymer. The reaction temperature was increased to 190° C., reaction pressure was decreased to 100 mmHg for 30 minutes, and then an excess amount of lactic acid was discharged while running the reaction under low vacuum. Subsequently, reaction pressure was slowly decreased to 10 mmHg and was maintained until the distillation column top temperature dropped below 35° C., thereby preparing a fatty acid and PLA grafted CNC (CNC-g-PLA-FA). Then, the viscous and syrupy product was collected into a ceramic bowl and cooled.

After the completion of reaction, the resulting nanoscale particles were separated from the unreacted fatty acid and homo-PLA oligomers by dispersion-centrifugation (6,000 rpm at 25° C. for 30 min.) several times with an excess of ethanol. Finally, the prepared nanoscale particles were dried at 50° C. for 24 h in a vacuum system and then were collected.

Method 2 to Prepare Fatty Acid Grafted CNCs (One-Pot-One-Step)

Method 2 is essentially the same as the procedure as described in Method 1, with the exception that the same amount of a fatty acid and a DBTDL catalyst were directly introduced to the aqueous LA and CNC suspension at the initial step of polyesterification of LA. The interfacial esterification reaction in Method 2 caused a 100% increase in reaction time compared to Method 1.

Method 3 to Prepare Fatty Acid Grafted CNCs with Recycled Agents (One-Pot-Two-Step)

Recycling fatty acids dissolved in the washing ethanol was conducted by distillation of the solvent via rotary-evaporation for 1 h. The procedure for the use of the recycled reagents to prepare fatty acid grafted CNCs was performed as described in Method 1, with the exception that the polyesterification of CNC with carboxylic acids was performed with half of the recycled reagents.

The materials to make the intermediate linker between CNCs and the fatty acid for the exemplified examples in the present disclosure is lactic acid and/or its oligomers polylactic acid (PLA). Fatty acids or fatty acid ester sources used to prepare the fatty acid grafted CNCs were selected from the list of hexanoic acid at 99.5%, dodecanoic acid at 98%, oleic acid at 90%, methyl palmitate at 97% technical grade, Tung oil at 80% ester of eleostearic acid, and Linseed oil. Table 1 provided the data of the degree of polymerization on CNCs ($DP_{avg}$) and the degree of substitution of the fatty acids in the fatty-acid-grafted CNCs prepared by Method 1, 2, or 3.

Examples 1-12 are prepared according Method 1, 2, or 3. Example 1 is polylactic acid grafted CNCs as a vehicle to compare with the additional fatty acid grafted Examples 2-12.

TABLE 1

Degree of polymerization of the grafted PLA and degree of substitution of the modified CNCs.

| | | PLA | | Fatty acid | |
|---|---|---|---|---|---|
| Examples | $DP_{avg}$ | DS | $DS_{surf}$ | DS | $DS_{surf}$ |
| 1. CNC-g-PLA | 6.0 | 0.03 | 0.24 | — | — |
| 2. CNC-g-PLA-C6-1 [a] | 2.1 | 0.04 | 0.31 | 0.01 | 0.06 |
| 3. CNC-g-PLA-C6-2 [b] | 3.0 | 0.04 | 0.30 | 0.01 | 0.05 |
| 4. CNC-g-PLA-C12-1 [a] | 2.6 | 0.06 | 0.45 | 0.02 | 0.14 |
| 5. CNC-g-PLA-C12-2 [b] | 2.7 | 0.04 | 0.28 | 0.02 | 0.14 |
| 6. CNC-g-PLA-C12-3 [c] | 3.0 | 0.03 | 0.25 | 0.02 | 0.13 |
| 7. CNC-g-PLA-C16-1 [a] | 8.0 | 0.04 | 0.29 | 0.01 | 0.06 |
| 8. CNC-g-PLA-C16-2 [b] | 2.7 | 0.03 | 0.24 | 0.01 | 0.12 |
| 9. CNC-g-PLA-C18-1 [a] | 2.9 | 0.03 | 0.24 | 0.02 | 0.19 |
| 10. CNC-g-PLA-C18-2 [b] | 2.3 | 0.04 | 0.30 | 0.02 | 0.12 |
| 11. CNC-g-PLA-Lin b | 8.2 | 0.04 | 0.31 | 0.01 | 0.04 |
| 12. CNC-g-PLA-Tung [b] | 3.1 | 0.06 | 0.47 | 0.01 | 0.11 |

[a] Fatty acids grafted CNCs produced via Method 1;
[b] Fatty acids grafted CNCs produced by Method 2;
[c] Fatty acids grafted CNCs produced by the recycled reagents via Method 1.

$DP_{avg}$, $DS_{surf}$, DS and DP are calculated based essentially on the well-known methods that can be found in J. L. Espartero, I. Rashkov, S. M. Li, N. Manolova, and M. Vert, NMR Analysis of Low Molecular Weight Poly(lactic acid)s, *Macromolecules*, 1996, 29, 3535-3539, and S. Eyleya, and W. Thielemans, Surface modification of cellulose nanocrystals, Nanoscale, 2014, 6, 7764.

$DP_{avg}$ is degree of polymerization of the PLA on the CNC.

$DS_{surf}$ is surface degree of substitution. $DS_{surf}$ value of 1.5 is the number of accessible hydroxyl groups per anhydroglucose unit (AGU) on the surface.

DS is degree of substitution, which is related to the number of grafted hydroxyl groups per AGU.

According to $^{13}$C CP/MAS solid-state NMR analysis results as illustrated in Table 1, the degree of polymerization of PLA (polylactic acid) is about three and the degree of substitution of grafted poly(lactic acid) and fatty acid are about 30% and 20%, respectively.

Overall, the $^{13}$C NMR results in Table 1 demonstrate the degree of substitution (DS and $DS_{surf}$) and the $DP_{avg}$ of the grafted LA oligomers. In Method 1, acid reagents show higher grafting efficiencies than ester reagents. The reverse is true of Method 2. For example, in the case of linseed oil and tung oil, there was no $^{13}$C-NMR peak corresponding to grafting of CNC. Thus, plant oil modified CNCs were inevitably created through Method 2. Furthermore, biodiesel modified CNC (CNC-g-PLA-C16-2) produced via Method 2 showed higher grafting efficiency than CNC-g-PLA-C16-1 produced via Method 1. These results suggest that a hydrolysis of ester type reagents is required prior to their esterification with alcohol type reagents. The reason for less grafting efficiency may be less wettability of the fatty acid methyl ester or triglyceride substances in the lactic acid derivatives medium. Moreover, the higher boiling temperature of glycerol derived from the plant oils might be unfavorable thermodynamically in accordance with the Le Chatelier principle. On the other hand, adjusting the pH to below 5 with fatty acids promotes their esterification reaction with CNC dispersed in lactic acid syrup. In the case of hexanoic acid, there were less $^{13}$C-NMR peaks corresponding to grafting of CNC. Due to its lower boiling temperature, a severe loss of hexanoic acid was caused by application of a vacuum during the polyesterification reaction of CNC-g-PLA-C6. $^{13}$C NMR data shows that the surface modification rate of the CNC-g-PLA-C12, CNC-g-PLA-C16, CNC-g-PLA-18, and CNC-g-PLA-Tung are more than 0.10.

To further analyze the modification efficiency of lactic acid and fatty acids onto the CNC, elemental analysis was used to evaluate the degree of substitution (DS). The weight fractions of C, H, O, and N elements for pristine CNC and modified CNCs. A change in the % C of modified CNC and the ratio 0/C change from 1.11 for pristine CNC to 0.92 for CNC-g-PLA-C12, 0.79 for CNC-g-PLA-C18, and 0.98 for CNC-g-PLA-Tung confirmed the successful grafting of fatty acids onto the CNC.

Characterization of Cellulose Nanocrystals

Fourier transform infrared Spectroscopy (FT-IR). FT-IR spectra of pristine CNC and modified CNCs were measured by making KBr pellets of the samples and performed in transmission mode (FTIR Spectrum 100, PerkinElmer, Waltham, Mass., USA). All spectra were taken per sample range from 450 to 4000 cm$^{-1}$ with a resolution of 4 cm$^{-1}$ and 10 scans.

$^{13}$C CP-MAS solid-state NMR Spectroscopy. $^{13}$C CP-MAS spectra were performed on a Chemagnetics CMX-400 NMR spectrometer equipped with a wide-bore magnet and a 5 mm triple-resonance (H—X-Y) MAS probe. The pulse sequence utilized was the "cp_toss_pm" sequence from the spectrometer's pulse program library, which contained the TOSS (Dixon et al. 1982) and TPPM techniques. Acquisition parameters contained $^1$H and $^{13}$C RF field strengths of 50 KHz, a cross-polarization time of 2 ms, a TPPM decoupling pulse of 7.1 µs, a relaxation delay of 6 s, a data acquisition time of 32 ms with a sweep width of 32 KHz, and a sample spinning rate of 5.6 KHz. Typically, 1024-2048 scans were acquired (103-206 mins) and the data were processed with exponential multiplication (line-broadening of 35 Hz) and zero-filled twice prior to Fourier transformation.

Elemental Analysis (EA)

Element analysis of the C, H, O, and N elements in the CNC and modified CNCs samples were performed by Galbraith Laboratories, Inc., Knoxville, Tenn., USA. The collected data have allowed the degree of substitution (DS), which is related to the number of grafted hydroxyl groups per anhydroglucose unit (AGU) according to the following Equation (1):

$$DS = \frac{6 \times M_{C-AGU} - \% \ C \times M_{AGU}}{M_{ester} \times \% \ C - M_{C-ester}} \quad (1)$$

where % C is the measured carbon content in the sample and $M_{C-AGU}$, $M_{AGU}$, $M_{ester}$, and $M_{C-ester}$ are linked to the carbon molecular mass of an anhydroglucose unit, the molecular mass of an anhydroglucose unit, the mass of the grafted ester and the carbon mass of the grafted moieties respectively. The analyses were performed twice and the average was used. They have been corrected assuming unmodified samples as pristine cellulose and samples made during the same analysis series.

Dispersibility Test

Pure CNC and modified CNCs were dispersed in solvents with different Hansen's solubility parameters (HSP) to evaluate their dispersibility. HSP is a typical tool utilized to evaluate the solubility of polymers in solvent and solvent blends. HSPs have three components: dispersion ($\delta_d$), polarity ($\delta_p$), and hydrogen bonding ($\delta_h$). The total solubility parameter ($\delta_t$) can be calculated using Equation 2, which takes interaction energy represented by all three components into account.

$$\delta_t^2 = \delta_d^2 + \delta_h^2 + \delta_p^2 \quad (2)$$

For study of dispersion of modified samples that were kept 'wet' in their washing solvent (Ethanol), the weight percentage of modified CNCs in the 'wet' samples was first fixed gravimetrically. A suitable amount of 'wet' sample was used to obtain 50 mg of modified CNC. A moderate amount of respective solvent was added so that the final concentration of modified CNC was kept at 10 mg/mL. The 'wet' sample was sonicated at 25% amplitude for 0.5 min and dispersed in its respective solvent. All of the suspensions were left standing for 24 hrs to allow possible precipitation before they were examined.

X-Ray Diffraction Analysis (XRD)

Pristine CNC and modified CNC powder were molded into pellets and attached on adhesive tapes. They were performed in a Bruker GADDS 2D X-ray diffractometer (2D-XRD) using a 546 nm Cu Kα source at 30 mA, 10 kV for 360 s and a beam size of 500 µm at 6.13 cm from detector in transmission mode. The intensity was plotted against the 2θ angles from the diffraction pattern. The CNC crystallinity index (CI) was evaluated using Equation (3):

$$CI = \left(1 - \frac{I_{AM}}{I_{(002)}}\right) \times 100 \quad (3)$$

where $I_{(002)}$ represents the peak intensity at (002) lattice plane (2θ=23°), while $I_{AM}$ represents the amorphous region and is the intensity of the area between 002 and 101 peaks (2θ=18.4°).

The esterification of Cellulose NanoCrystal (CNC) by fatty acids, biodiesel, or plant oils was conducted via a method using a reactant as solvent. This method coincides with the following criteria of an ecofriendly production process: the use of an aqueous suspension and renewably-sourced lactic acid/fatty acids for grafting, low environmental foot-print of the product, low VOC emissions, and the possibility to reuse excess reactant derivatives by purification. The key factor of the green process is the use of lactic acid, which is the reactant of the hydrophobization, as the solvent for the esterification of CNC with fatty acids, biodiesel, or plant oils having a long hydrocarbon chain. The aqueous lactic acid syrup and its oligomers can provide a stable and well-dispersed water suspension of CNC and participate in esterification reactions; producing the intermediate product of PLA oligomer grafted CNC (CNC-g-PLA). This reactive solvent and intermediate product system allows for further efficient esterification of CNC with fatty acids due to an in situ solvent exchange from water to lactic acid and its derivatives without prior drying of the CNC and the improved compatibility/wettability between CNC-g-PLA and fatty acid and of both in the exchanged solvent.

In the step 1 of Method 1 to prepare fatty acid grafted CNCs, the CNC-g-PLA was directly prepared by in situ reaction of CNC with lactic acid in aqueous media in the presence of zinc acetate dihydrate $[Zn(O_2CCH_3)_2(H_2O)_2]$. Then, a water distillation accompanied by the polyesterification of lactic acid leads to an in situ solvent exchange from water to the lactic acid oligomers. After adding a fatty acid in step 2 of Method 1, the excellent wetting behavior of reagents by the lactic acid oligomers allows for the esterification of a fatty acid with the CNC-g-PLA in the presence of dibutyltin dilaurate (DBTDL). In Method 2 to prepare fatty acid grafted CNCs, all components can form an oil-in-water emulsion, wherein a fatty acid is the dispersed oil phase and aqueous lactic acid suspension of CNC is the external phase. A direct condensation of lactic acid monomers happens through water distillation. Water removal by azeotropic distillation is crucial to favor the esterification condensation reaction. Catalysts such as zinc acetate, manganese acetate, and alkali metal alcoholates may be applied if desired to increase reaction yield.

The CNC-g-PLA was also produced by the mixture of lactic acid derivatives utilized for the esterification of a CNC. Then, as a reagent for the esterification of a CNC-g-PLA, hexanoic acid, dodecanoic acid, methyl palmitate, oleic acid, tung oil, and linseed oil were utilized. Grafting agents with different hydrocarbon lengths and acid/ester (or glyceride) functions were compared to examine the role of reagent types on modification and hydrophobization of CNCs. A constant molar ratio between the reagents and the CNC hydroxyl group was applied to provide a fair comparison between fatty acids (or fatty acid esters) with different lengths of hydrocarbon chains.

Recycling of Carboxylic Acids

This single-pot, aqueous surface hydrophobization procedure uses the reactant, lactic acid, and its oligomers as the solvent. These lactic acid derivatives (monomer or oligomers) and fatty acid used can be recycled in order not only to enhance economic feasibility, but also to decrease the environmental footprint of the product. To make sure that these byproducts can be recycled and reused as reactants in subsequent reactions, we examined the exact composition of byproducts through $^1$H NMR analysis and conducted a grafting reaction using half of the recycled reagents. Byproducts were composed mainly of PLA oligomer dodecanoic acid esters (including traces of free PLA oligomers and dodecanoic acid). There was no loss of the reactive site of the reagents due to the conditions of high temperature (above 150° C.) and low pH (below 5).

Qualitative Characterization of the Grafting Efficiency

FT-IR spectra of the pristine CNC, CNC-g-PLA, and CNC-g-PLA-FAs were used as the qualitative characterization to show the grafting efficiency. Compared with the spectrum of CNC, a new peak appeared at ca. 1,750 cm$^{-1}$, which was not shown in unmodified CNCs. This new peak may be attributed to either the emerging carbonyl groups of the ester bond in polylactic acid or in the fatty acid ester, demonstrating esterification success of the CNC. Signals at 1700 cm$^{-1}$ related to lactic acid and fatty acid reagents was not observed for modified CNCs indicating purity and efficiency of the washing step during work-up. At the same time, the relative height change of other peaks in the fingerprint region after modification was observed at 1100 cm$^{-1}$. Nevertheless, both peak heights at 1750 cm$^{-1}$ and 1100 cm$^{-1}$ could provide a rough comparison among different efficiencies of grafting for fatty acid ester side chains due to the existence of the PLA side chain.

Unlike Tung oil composed of nearly aliphatic carboxylic acids, not triglyceride, the poor reactivity of Linseed oil reaction demonstrated the significance of appropriate plant oil selection for the application of the esterification method. All CNC-g-PLA-C12-1, -2, and -3 samples produced by using three different methods: Method 1, Method 2, and the recycling method exhibited similar grafting efficiencies, although double reaction times of Method 2 and the reagents-recycled process were needed due to their interfacial reactions. Likewise, CNC-g-PLA-C6-1 and -2 have similar grafting efficiencies. However, in the case of a long chain oleic acid, there was a considerable difference between grafting efficiencies of CNC-g-PLA-C18-1 and -2. In conclusion, in order to successfully graft on the cellulose surface, the fatty acid should be free long-chain fatty acids rather than triglycerides or fatty acid esters in Route 1 and high-boiling substances (boiling points higher than 200° C. at 100 mmHg) in both Route 1 and 2.

To further analyze the modification efficiency of LA and FAs onto the CNC, elemental analysis was used to evaluate the degree of substitution (DS). The weight fractions of C, H, O, and N elements for pristine CNC and modified CNCs. A change in the % C of modified CNC and the ratio O/C change from 1.11 for pristine CNC to 0.92 for CNC-g-PLA-C12, 0.79 for CNC-g-PLA-C18, and 0.98 for CNC-g-PLA-Tung confirmed the successful grafting of fatty acids onto the CNC.

Morphology and Crystallinity of Pristine CNC and Modified CNCs

The grafting reaction needs to conserve the morphology and crystallinity of CNC in order to be a practicable grafting method. The dimensions of length (L) of 64±5 nm and width (d) of 7±1 nm of CNC obtained by TEM analysis coupled with Image J treatment. Negatively stained images of other types of modified CNCs could not be obtained by TEM due to aggregation in water and methanol and inadequate staining using aqueous electron stains. Accordingly, DLS was a more practical approach to a quick comparison of samples, although TEM must be conducted to accurately measure the particle sizes. DLS of the pristine CNC in water and CNC-g-PLA-C18 in acetone presented apparent particle sizes of 124 nm (61 nm after sonication for 30 s) and 285 nm, respectively, having a unimodal particle size distribution and exhibiting no aggregation in the samples. Since the Stokes-Einstein equation in the DLS technique was derived under the assumptions of the hydrodynamic diameter of a spherical particle, the particle sizes obtained were the approximate values and did not indicate the actual dimensions of the rod-like nanoparticles. Nano-scale characterization of pristine CNC and modified CNC suspensions by TEM and DLS shows that the surface modification did change the size a little, but it did not change either morphology or degree of aggregation of the pristine CNC in various solvents arranged according to Hildebrand solubility parameter.

The analysis of the X-ray diffraction patterns for pristine CNC and modified CNCs were performed to check a change in the crystalline structure of CNC. There was only a slight decrease (less than 20%) in crystalline index (CI) after grafting. This slight reduction in crystallinity is most likely related to the appearance of new peaks corresponding to aliphatic chains around 21° after grafting. An additional method, developed by Newman et al, examined the separation area ratio of C4 carbon peak in $^{13}$C NMR spectra to calculate the CI of pristine CNC and modified CNCs. The CI of both pristine CNC and modified CNCs was measured by using this method. The result suggests that there was little change in the CI after grafting.

Dispersion Test of Modified CNCs in Organic Solvents

The main purpose of hydrophobization of CNCs is to improve their dispersibility in an organic solvent and polymer matrix. Pristine CNC and modified CNCs were dispersed in solvents (water, ethanol, acetonitrile, acetone, 1-methoxy-2-propanol, tetrahydrofuran, chloroform, and toluene). Modified CNCs were kept in their washing solvent (ethanol) after centrifugation as a concentrated gel-like form in order to enhance their dispersibility. These 'wet' samples were then redispersed in organic solvents by a sonification for at least 30 secs. The suspensions were left undisturbed overnight to equilibrate and allow for the visual observation of precipitation behavior. The presence of residual washing solvent can bring about a change in the HSP value of the final solvent in the suspension. However, due to the infinitesimal presence of residual washing solvent, the overall HSP value of the solvent mixture did not alter drastically.

The compatibility of the pristine CNC with hydrophobic systems is very low because of the hydrophilic nature of the CNC surface. The improvement of the CNC dispersion in an organic solvent after surface grafting was achieved. The modified CNCs were homogeneously dispersed in various organic solvents, while pristine CNC aggregated and precipitated to the bottom.

On the whole, major factors must be considered to determine the most workable reagents to hybridize CNCs. The hydrophobicity of the grafted CNCs, which is determined by the chemical structure of the side chain aliphatic groups of reagents, is governed by their practical application. In this system, easy-to-use and commercially available reagents: fatty acids or their ester derivatives can be utilized. Not only that, but untreated raw materials: biodiesel or high free fatty acid types of plant oils can be used. This esterification method is not limited by a water immiscibility of a fatty acid. The use of various kinds of inexpensive commercial carboxylic acids is allowed by a lactic acid reactive solvent system which is a solvent-free one-pot synthesis in aqueous medium. For surface modifications of CNCs, longer chain fatty acids grafting is more recommended than shorter ones. Therefore, the simple, ecofriendly and industrially-friendly technology of the herein disclosed green process meets the feasibility of scaling up a surface modification process of CNCs. For nanocomposites based on C12-C18 fatty acid-grafted CNCs, the storage modulus might be expected to increase with the filler content since their long side chain moiety enables nanoparticles to have a good nanofiller-matrix interfacial interaction and load transfer.

In one embodiment, the present disclosure provides a composition of cellulose nanoparticles, wherein the chemical structure of the cellulose nanoparticles comprising a glucose unit of formula I:

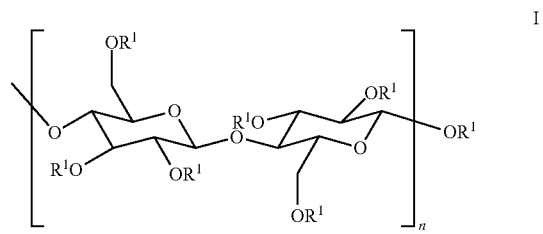

Wherein $R^1$ is H or

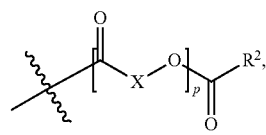

wherein each $R^1$ in formula I may be the same or different, and at least one $R^1$ is not H;

X is C1-C8 straight or branched carbon linker, wherein X is optionally substituted with C1-C4 alkyl, F, Cl, —OMe, or OEt;

$R^2$ is a C5-C10 hetero or carbon aryl wherein the hetero aryl comprising N, O or S; or a C1-C24 straight or branched alkyl or alkenyl, wherein the C1-C24 straight or branched alkyl or alkenyl is optionally substituted with a C5-C10 hetero or carbon aryl wherein the hetero aryl comprising N, O or S, a C1-C4 alkyl, F, Cl, —OMe, or OEt; and n is 10-20,000, p is 1-12.

In one embodiment, X is —CH(CH$_3$)— in formula I.

In one embodiment, $R^2$ is C4-C20 straight or branched alkyl or alkenyl in formula I.

In one embodiment, $R^2$ in formula I is selected from the group consisting of

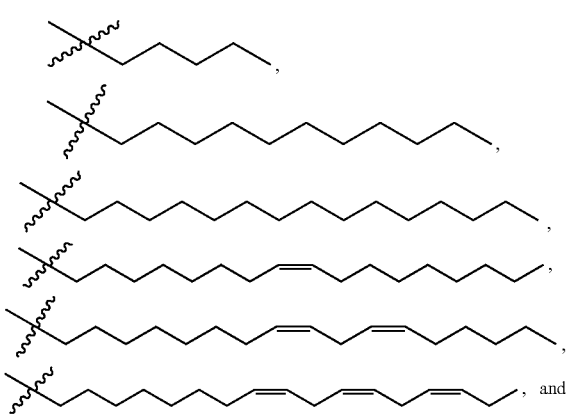

-continued

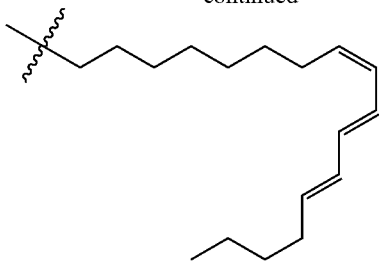

In one embodiment, n is 100-5000 and p is 2-6 in formula I.

In one embodiment, in formula I, X is —CH(CH$_3$)—, n is 100-5000, p is 2-6, R$^2$ is C4-C20 straight or branched alkyl or alkenyl.

In one embodiment, in formula I, X is —CH(CH$_3$)—, n is 100-5000, p is 2-6, R$^2$ is a C5-C10 hetero or carbon aryl wherein the hetero aryl comprising N, O or S.

In one embodiment, in formula I, wherein the C5-C10 hetero or carbon aryl may include but are not limited to phenyl, naphthyl, pyridyl, indol, thienyl, thiazolyl, imidazolyl, or fural.

In one embodiment, in formula I, wherein the C5-C10 hetero or carbon aryl may include but are not limited to phenyl, naphthyl, pyridyl, indol, thienyl, thiazolyl, imidazolyl, or fural, wherein the C5-C10 hetero or carbon aryl is optionally substituted with C1-C4 alkyl, F, Cl, OMe, or OEt.

In one embodiment, the present disclosure provides a method of making a composition of cellulose nanoparticles with a chemical structure comprising a glucose unit of formula I, wherein the method comprises:
d) contacting cellulose nanoparticles with water, a catalyst suitable for esterification, and a carboxylic acid with the formula of HOOC—X—OH, wherein X is C1-C8 straight or branched carbon linker, wherein X is optionally substituted with C1-C4 alkyl, F, Cl, —OMe, or OEt, and heating the formed mixture;
e) removing water to facilitate the esterification reaction; and
f) adding a carboxylic acid with the formula of HOOCR$^2$, wherein R$^2$ is defined in claim 1.

In one embodiment, the present disclosure provides a method of making a composition of cellulose nanoparticles with a chemical structure comprising a glucose unit of formula I, wherein the method comprises:
a) contacting cellulose nanoparticles with water, a catalyst suitable for esterification, a carboxylic acid with the formula of HOOC—X—OH, wherein X is C1-C8 straight or branched carbon linker, wherein X is optionally substituted with C1-C4 alkyl, F, Cl, —OMe, or OEt, and a carboxylic acid with the formula of HOOCR$^2$, wherein R$^2$ is a C5-C10 hetero or carbon aryl wherein the hetero aryl comprising N, O or S; a C1-C24 straight or branched alkyl or alkenyl, wherein the C1-C24 straight or branched alkyl or alkenyl is optionally substituted with a C5-C10 hetero or carbon aryl wherein the hetero aryl comprising N, O or S, a C1-C4 alkyl, F, Cl, —OMe, or OEt; and
b) removing water to facilitate the esterification reaction.

In one embodiment, the present disclosure provides that the cellulose nanoparticle has a length dimension of about 50 nm to about 2000 nm; a lateral dimensions of about 2 nm to about 20 nm; and an aspect ratio of about 2.5 to about 1000.

In one embodiment, the present disclosure provides that the cellulose nanoparticle is cellulose nanocrystal or cellulose nanofibril.

In one embodiment, the present disclosure provides that at 5-60% of hydroxyl groups are grafted. In one aspect, 10-45% of hydroxyl groups are grafted. In one aspect, 25-40% of hydroxyl groups are grafted.

In the context of the present disclosure, unless otherwise defined, any of the terms used herein should be interpreted as the meaning that is generally accepted by a person with ordinary skill in the art.

Those skilled in the art will recognize that numerous modifications can be made to the specific implementations described above. The implementations should not be limited to the particular limitations described. Other implementations may be possible. In addition, all references cited herein are indicative of the level of skill in the art and are hereby incorporated by reference in their entirety.

The invention claimed is:
1. A method of making a composition of cellulose nanoparticles, wherein the chemical structure of the cellulose nanoparticles comprising a glucose unit of formula I, wherein the method comprises:
a) contacting cellulose nanoparticles with water, a catalyst suitable for esterification, and a carboxylic acid with the formula of HOOC—X—OH, and heating the formed mixture, wherein said carboxylic acid is used as both a reactant and a co-solvent with water, wherein said formed mixture is substantially free of other organic solvent;
b) removing water to facilitate the esterification reaction; and
c) adding a carboxylic acid with the formula of HOOCR$^2$, wherein the formula I is:

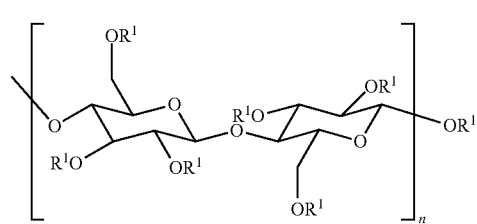

wherein R$^1$ is H or

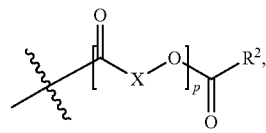

wherein each R$^1$ in formula I may be the same or different, and at least one R$^1$ is not H;
X is C1-C8 straight or branched carbon linker, wherein X is optionally substituted with C1-C4 alkyl, F, Cl, —OMe, or OEt;
R$^2$ is a C5-C10 hetero or carbon aryl wherein the hetero aryl comprising N, O or S; a C11-17 straight or branched alkyl or alkenyl, wherein the C11-17 straight or branched alkyl or alkenyl is optionally substituted with a C5-C10 hetero or carbon aryl wherein the hetero aryl comprising N, O or S, a C1-C4 alkyl, F, Cl, —OMe, or OEt; and
n is 10-20,000, p is 1-12.

2. The method of claim 1, wherein the step c) of adding a carboxylic acid with the formula of $HOOCR^2$ is carried out in step a) prior to the heating.

3. The method of claim 1, wherein X is —CH(CH3)—, and wherein $R^2$ is C11-C17 straight or branched alkyl or alkenyl.

\* \* \* \* \*